(12) United States Patent
Klipshtein

(10) Patent No.: US 10,835,073 B2
(45) Date of Patent: Nov. 17, 2020

(54) DEVICE FOR THE PREVENTION OF COOKING BOILOVER

(71) Applicant: Hutzler Manufacturing Co., Inc., Canaan, CT (US)

(72) Inventor: Guy Klipshtein, Givatayim (IL)

(73) Assignee: Hutzler Manufacturing Co., Inc., Canaan, CT (US)

( * ) Notice: Subject to any disclaimer, the term of this patent is extended or adjusted under 35 U.S.C. 154(b) by 148 days.

(21) Appl. No.: 15/913,421

(22) Filed: Mar. 6, 2018

(65) Prior Publication Data

US 2019/0274464 A1    Sep. 12, 2019

(51) Int. Cl.
*A47J 27/56* (2006.01)
*B01B 1/02* (2006.01)

(52) U.S. Cl.
CPC ............... *A47J 27/56* (2013.01); *B01B 1/02* (2013.01)

(58) Field of Classification Search
CPC ... A47J 27/56; A47J 27/58; B01B 1/02; A01J 11/02
See application file for complete search history.

(56) References Cited

U.S. PATENT DOCUMENTS

| | | | |
|---|---|---|---|
| 2,925,082 A | 2/1960 | Brownrigg | |
| 3,465,745 A | 9/1969 | Butler | |
| 3,809,064 A | 5/1974 | Ziegler | |
| 4,467,784 A * | 8/1984 | Lee | A47J 27/58 126/384.1 |
| 5,881,905 A | 3/1999 | Brady | |
| 6,105,811 A * | 8/2000 | Alfred | A47J 36/06 220/287 |
| D582,205 S | 12/2008 | Gerlach | |
| 8,590,728 B1 | 11/2013 | McPherson | |
| RE45,375 E * | 2/2015 | Harecker | A47J 36/06 220/360 |
| 9,072,399 B2 | 7/2015 | McPherson | |
| 9,504,355 B2 | 11/2016 | Lee et al. | |
| 9,655,471 B2 | 5/2017 | Zaczyk | |
| 10,194,766 B2 * | 2/2019 | Mesmer | A47J 27/04 |

(Continued)

FOREIGN PATENT DOCUMENTS

| FR | 1537266 | | 8/1967 |
|---|---|---|---|
| JP | 2010042100 A | * | 2/2010 |

(Continued)

OTHER PUBLICATIONS

Cooking boil over preventer, folding collander, The Sentinel Boil Over Minder for Home Brewing, Sep. 30, 2016, see image capture. https://www.youtube.com/watch?v=FZv6qPetsoA (Year: 2016).*

*Primary Examiner* — Gregory A Wilson
(74) *Attorney, Agent, or Firm* — Patent Technologies, LLC; Robert D. Gunderman, Jr.

(57) ABSTRACT

A device for the prevention of cooking boilover is disclosed. The device is placed on a cooking vessel while in use to disrupt building surface tension in a boiling liquid, and thus reduce or eliminate the tendency for the cooking vessel to boil over. The device for the prevention of cooking boilover ("boilover preventer") has a first supporting member and a second supporting member with a center portion joined to each supporting member and having a generally concave upper surface with holes there through.

20 Claims, 14 Drawing Sheets

(56) References Cited

U.S. PATENT DOCUMENTS

| | | | |
|---|---|---|---|
| 2004/0200841 A1* | 10/2004 | Seiple | A47J 27/58 |
| | | | 220/369 |
| 2006/0096929 A1* | 5/2006 | Repp | A47J 19/00 |
| | | | 210/740 |
| 2008/0272124 A1* | 11/2008 | Shamoon | A47J 37/101 |
| | | | 220/370 |
| 2010/0180777 A1 | 7/2010 | Deppieri | |
| 2014/0193560 A1 | 7/2014 | Viancin | |
| 2016/0192804 A1 | 7/2016 | Mesmer | |
| 2017/0172337 A1* | 6/2017 | Yamada | A47J 27/58 |
| 2019/0110482 A1* | 4/2019 | Wang | A47J 37/10 |

FOREIGN PATENT DOCUMENTS

| | | |
|---|---|---|
| JP | 2010022790 | 4/2010 |
| JP | 2018202016 A * | 12/2018 |
| WO | WO-2013081253 A1 * | 6/2013 |
| WO | WO-2015049625 A1 * | 4/2015 |

\* cited by examiner

DEVICE FOR THE PREVENTION OF COOKING BOILOVER

BACKGROUND OF THE INVENTION

1. Field of the Invention

This invention relates generally to cooking utensils, and more specifically to a Device for the Prevention of Cooking Boil Over.

2. Description of Related Art

When boiling many food items on a stovetop or similar appliance, there is a tendency for a boilover, particularly when cooking food items that have a high starch or sugar content. The boilover in many cases is caused by starch being released into the cooking water as the food cooks. Pasta, rice, beans, lentils are just a few of many food items that are cooked by boiling and have a tendency to boil over the edge of a cooking vessel such as a pot, a saucepan, a kettle, or the like. The released starch chemically and thermodynamically combines with the boiling water and results in foamy bubbles that do not burst and dissipate in the same way that boiling water bubbles alone do. This buildup of foamy bubbles does not subside, but rather, builds up and traps heat and steam under the layer of foamy bubbles, causing the boiling water and food composition to overflow the cooking vessel, resulting in both a safety hazard as well as a mess to clean up.

Techniques to deal with this ongoing problem include carefully watching the pot or vessel, reducing the amount contained in the pot or vessel, or otherwise expending diligent efforts to prevent a boilover. While caution and focus may seem like the best solution to this timeless problem, with other cooking tasks at hand and the general distractions that oftentimes occur, this is not always practical or well executed.

Astoundingly, the old wives tale that placing a wooden spoon over a pot of boiling pasta or rice will prevent a boilover may actually work to some degree. Unfortunately, there is often the need for multiple spoons in order for this solution to be even reasonably effective, and regardless of the number of spoons used a boilover is still a very real possibility. In addition, the wooden spoons will significantly absorb steam and starch during their time above the steaming pot, and the absorbed water and starch will not clean off, resulting in the growth of bacteria and mold on the spoon. The steam will also often change the shape of the softened wood, resulting in a less than useful wooden spoon.

What is therefore needed is a boilover preventer that is configured to traverse the top of a cooking vessel, is easy to clean, hygienic and provides a shape and structure that optimally reduces the buildup of foam and bubbles during the cooking of many food items.

The present invention has solved these heretofore unmet needs. The geometries and structural configuration of the boilover preventer of the present invention have been found to optimally reduce the tendency for a boilover during cooking operations. The details of such a device being disclosed herein.

BRIEF SUMMARY OF THE INVENTION

In accordance with the present invention, there is provided a device for the prevention of cooking boilover, the device comprising a first supporting member and a second supporting member; a center portion having a generally rounded shape and joined to the first supporting member and the second supporting member; the center portion having a generally concave upper surface and a generally convex lower surface with a plurality of holes through the center portion.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which.

Figure 1:
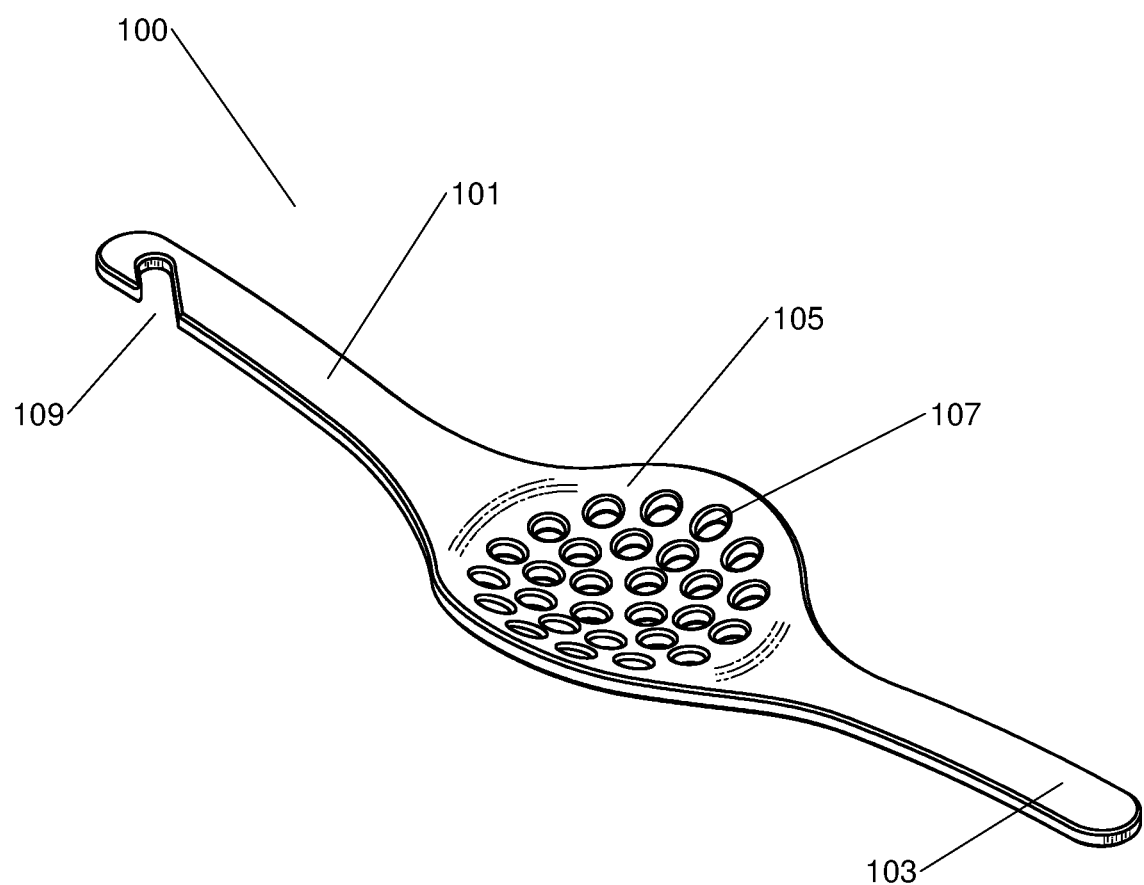
FIG. 1 is a top perspective view of a Boilover Preventer of the present invention.

The attached figures depict various views of the Device for the Prevention of Cooking Boilover (Boilover Preventer) in sufficient detail to allow one skilled in the art to make and use the present invention. These figures are exemplary, and depict a preferred embodiment; however, it will be understood that there is no intent to limit the invention to the embodiment depicted herein. On the contrary, the intent is to cover all alternatives, modifications, and equivalents as may be included within the spirit and scope of the invention as defined by this specification, claims and drawings.

DESCRIPTION OF THE PREFERRED EMBODIMENTS

A Device for the Prevention of Cooking Boilover, also referred to herein as a Boilover Preventer, is described and depicted by way of this specification and the attached drawings. For a general understanding of the present invention, reference is made to the drawings. In the drawings, like reference numerals have been used throughout to designate identical elements.

FIG. 1 is a top perspective view of the Device for the Prevention of Cooking Boilover (or Boilover Preventer) that shows the general overall appearance and features of the device. The Boilover Preventer 100 has a first supporting member 101, a second supporting member 103, and a center portion 105. The purpose of the first supporting member and the second supporting member is to allow the device to traverse the top edges of a cooking vessel such as a pot, a saucepan, a kettle or the like, and be supported by the top of the cooking vessel and over the water or liquid composition to be protected from a boilover. The first supporting member 101 and the second supporting member 103 curve or are otherwise angled downward as they join the center portion 105, thus allowing the center portion 105 to be in close proximity or in the surface of the boiling liquid without the necessity for the liquid to be at or close to the top of the cooking vessel. The first supporting member 101 and the second supporting member 103 may also have an arcuate curvature. This arcuate curvature may be simple or complex, and may, in some embodiments, be downwardly concave. As used herein, the term downward refers to the direction of a portion of the device that faces or is directed toward the cooking vessel that the device is being used with. The first supporting member 101 or the second supporting member 103 may also, in some embodiments of the present invention, have a hook, slot, hole, or the like to facilitate storage of the device when not in use. Each of the supporting members has a top surface and a bottom surface and is also generally or substantially flat along the bottom surface to allow the Device for the Prevention of Cooking Boilover 100 to sit squarely and firmly on the top edge of the cooking vessel. In some embodiments of the present invention, such a flat bottom surface may be part of a generally rectangular shape for each of the supporting members. Each of the supporting members joins the center portion 105 in either a curvilinear or angular manner.

In some embodiments of the present invention, the first supporting member 101 or to the second supporting member 103 comprise a slot or hanger 109 for storage. The slot or hanger may be an angled opening in either or both supporting members that allows the device to be retained on a hook, cookware suspension grid, or the like. Further embodiments of the present invention may have such a slot or hanger absent.

The supporting members may also have rounded, tapered or otherwise geometrically formed ends such as the rounded ends depicted in the figures.

The center portion 105 has an upper surface that is generally concave (rounded inward) and a corresponding lower or downwardly directed surface that is convex (rounded outward). The lower surface extends toward the surface of boiling liquid when in use. The center portion 105 further has a plurality of holes 107. These holes may be arranged in a variety of patterns and geometries, and allows for increased break up of surface tension and resulting foaming bubbles, increasing the effectiveness of the device of the present invention. In one aspect of the present invention, the holes are configured as depicted in the figures, and comprise a diameter in the range of 1-15 millimeters, and in one embodiment comprise a diameter of 5-10 millimeters, with a diameter of 8 millimeters employed in one embodiment thereof. The center portion 105 is round or oval and joins with the supporting members; presenting a downwardly sloping and generally convex lower surface to the boiling liquid.

In some embodiments of the present invention, the generally concave upper surface of the center portion 105 has a periphery with an upwardly sloping edge that is lower where the center portion meets each supporting member than along the remainder of the periphery. Each supporting member 101 and 103 joins the center portion 105 in a curvilinear manner where each supporting member gradually becomes wider, forming a curvilinear edge that becomes the rounded or oval center portion 105. In other words, the curvilinear joining of the supporting members with the center portion 105 creates an arc or curve where the supporting members gradually become wider as they merge with and form the center portion 105. Such arc or curve is concave and also compound. The arc or curve that forms the center portion 105 from each supporting member also rises upward to form the concave upper surface of the center portion 105. In further embodiments, each supporting member joins the center portion 105 in an angular manner where the curve or arc previously described is replaced with an angle that may be in the range of zero degrees to 180 degrees. A zero degree angle implies that the supporting members and the center portion 105 do not vary in width, whereas a 90 degree angle implies that the center portion is of a square, rectangular or polygonal form.

The Device for the Prevention of Cooking Boilover (or Boilover Preventer) 100 may be made from a material such as a rigid material, for example a plastic or a metal. Examples of suitable plastics include melamine, polypropylene, polyvinyl chloride, polytetrafluoroethylene, silicone, other high temperature materials, and the like. Bioplastics may also be used in some embodiments of the present invention. In addition, reinforced plastics, metals, and other materials that may be suitably formed may also be used. The Device for the Prevention of Cooking Boilover (or Boilover Preventer) may be made by injection molding, blow molding, machining, or the like.

Figure 2:
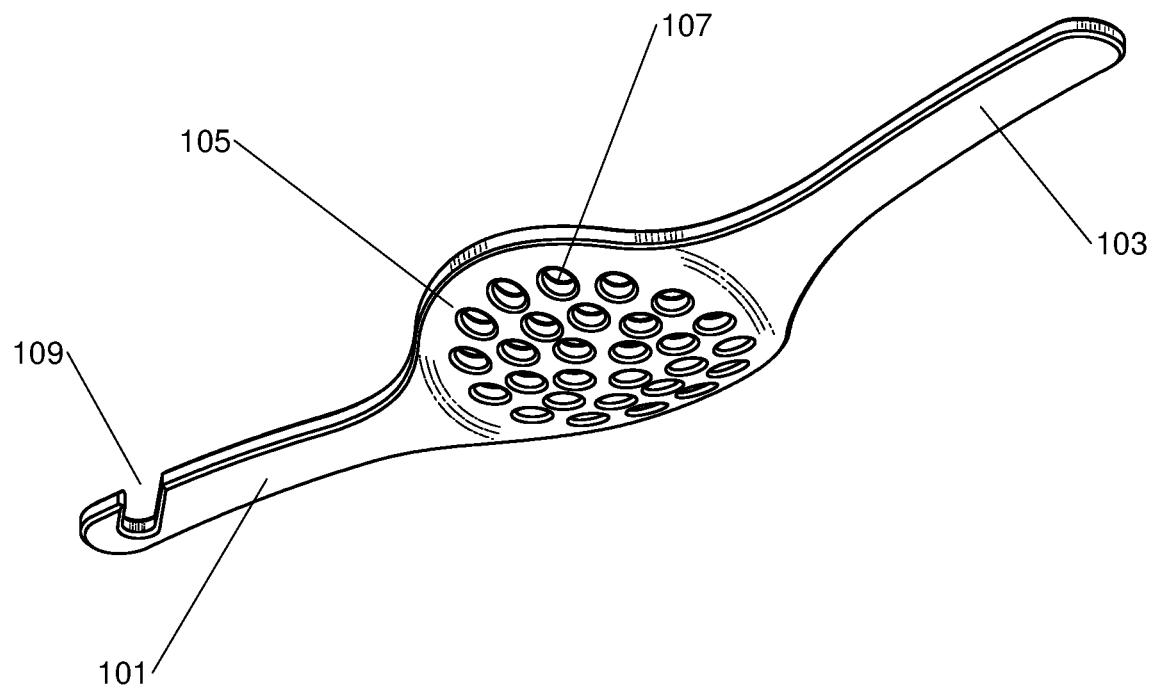
FIG. 2 is a bottom perspective view of the Boilover Preventer of FIG. 1.

Turning now to FIG. 2, a bottom perspective view of the Device for the Prevention of Cooking Boilover (Boilover Preventer) 100 can be seen. The geometries heretofore described can be seen. The convex lower surface of the center portion 105 being visible along with the plurality of holes 107. It should be noted that while the holes 107 are depicted as circular, they may also be adapted to a variety of shapes such as various polygons, ovals, and the like.

Figure 3:
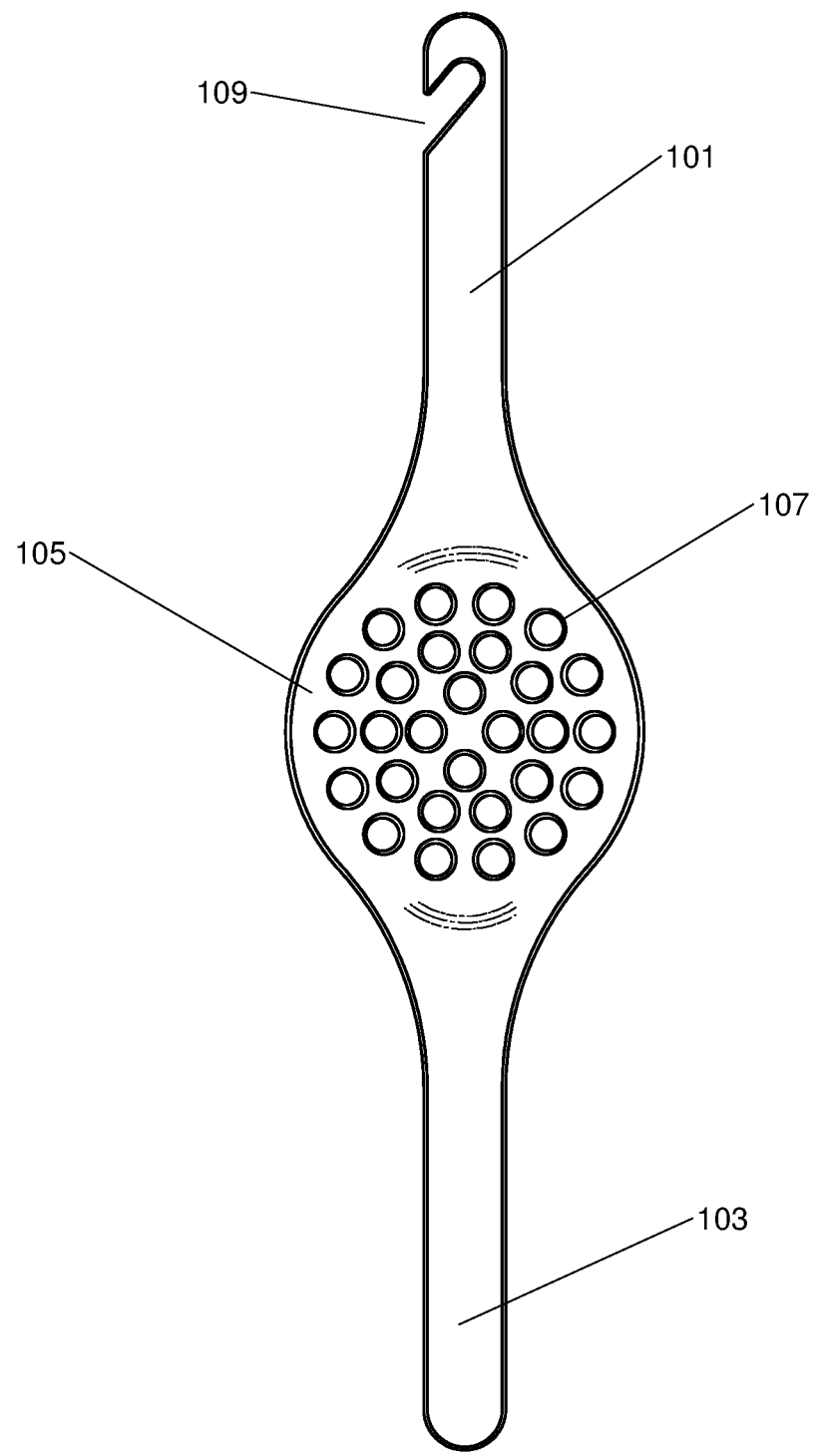
FIG. 3 is a top plan view of the Boilover Preventer of FIG. 1.

FIG. 3 is a top plan view of the Boilover Preventer showing clearly the way in which the first supporting member 101 and the second supporting member 103 join to the center portion 105.

Figure 4:
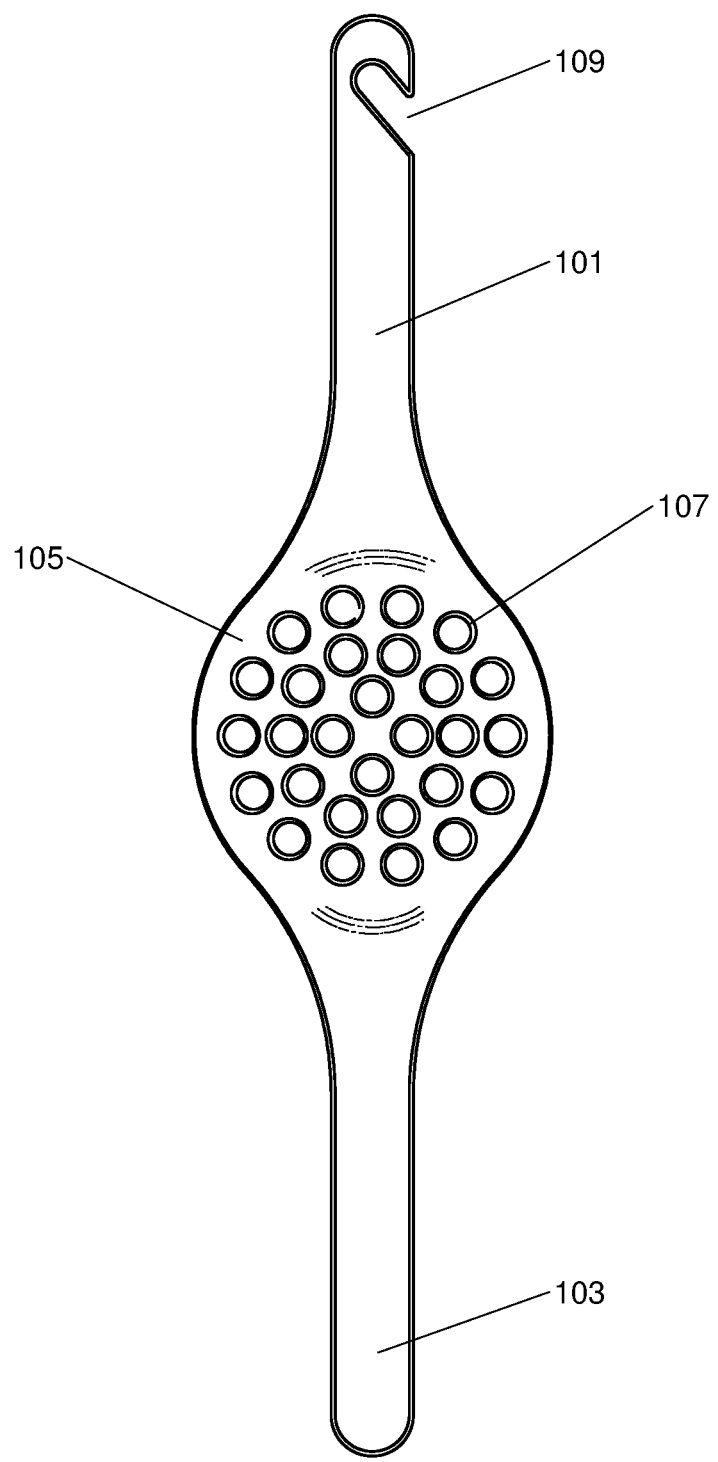
FIG. 4 is a bottom plan view of the Boilover Preventer of FIG. 1.

FIG. 4 is a bottom plan view of the Boilover Preventer where the plurality of holes 107 through the center portion 105 can be seen.

Figure 5:
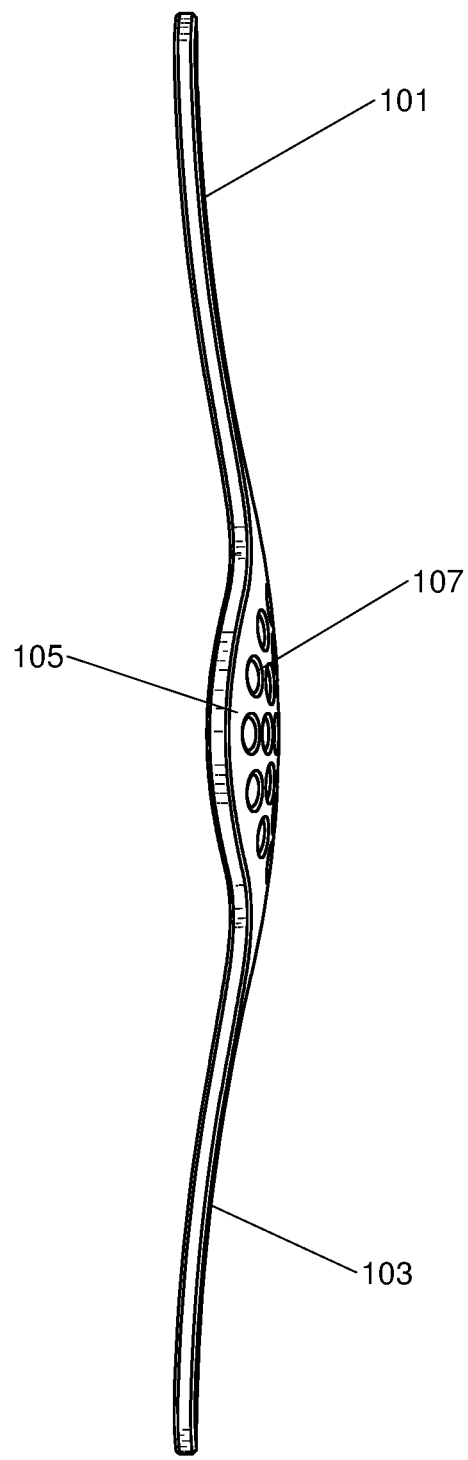
FIG. 5 is a side plan view of the Boilover Preventer of FIG. 1.
Figure 6:
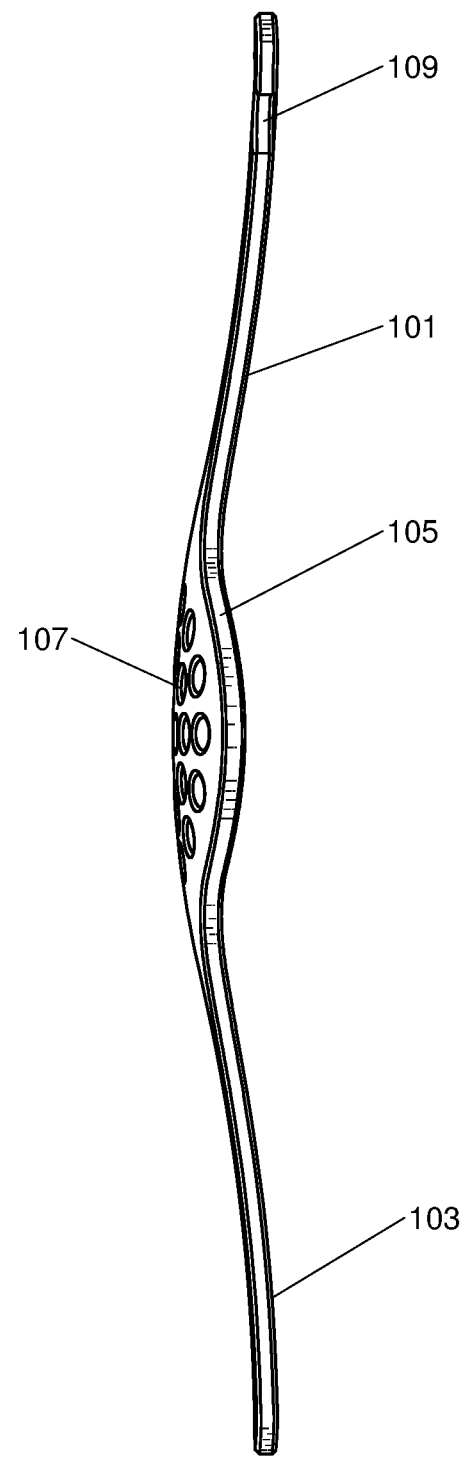
FIG. 6 is an alternate side plan view of the Boilover Preventer of FIG. 1.

FIG. 5 is a side plan view of the Boilover Preventer and FIG. 6 is an alternate side plan view of the Boilover Preventer, both of which depict the curved or arcuate geometries of the device that facilitate placement on a cooking vessel and subsequent boilover reduction or elimination while the cooking vessel is in use.

Figure 7:
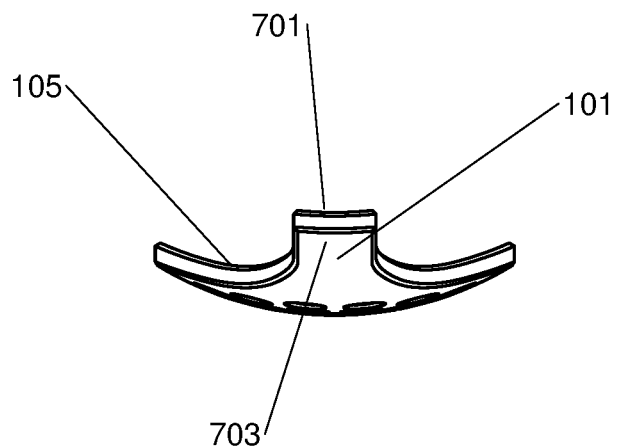
FIG. 7 is an end plan view of the Boilover Preventer of FIG. 1.
Figure 8:
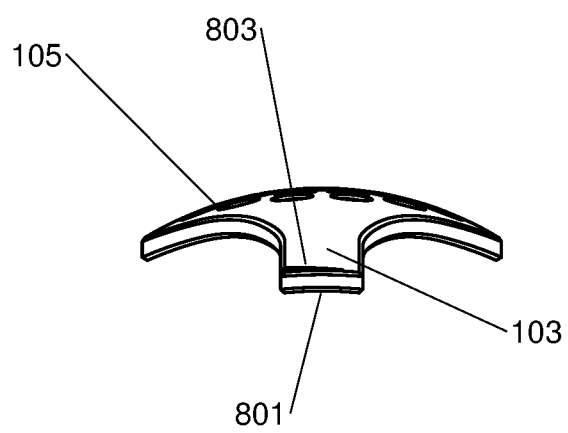
FIG. 8 is an alternate end plan view of the Boilover Preventer of FIG. 1.

FIG. 7 is an end plan view of the Boilover Preventer and FIG. 8 is an alternate end plan view of the Boilover Preventer, showing clearly the concave upper surface of the center portion 105. As can be seen in FIG. 7, in some embodiments of the present invention, the first supporting member 101 has a generally concave upper surface 701 and a generally convex lower surface 703. FIG. 8 also shows that the second supporting member 103 may, in some embodiments, have a generally concave upper surface 801 and a generally convex lower surface 803. As recited previously herein, the lower surface extends toward the surface of boiling liquid when in use. Further embodiments may, as previously stated herein, have a substantially flat bottom surface with each supporting member.

Figure 9:
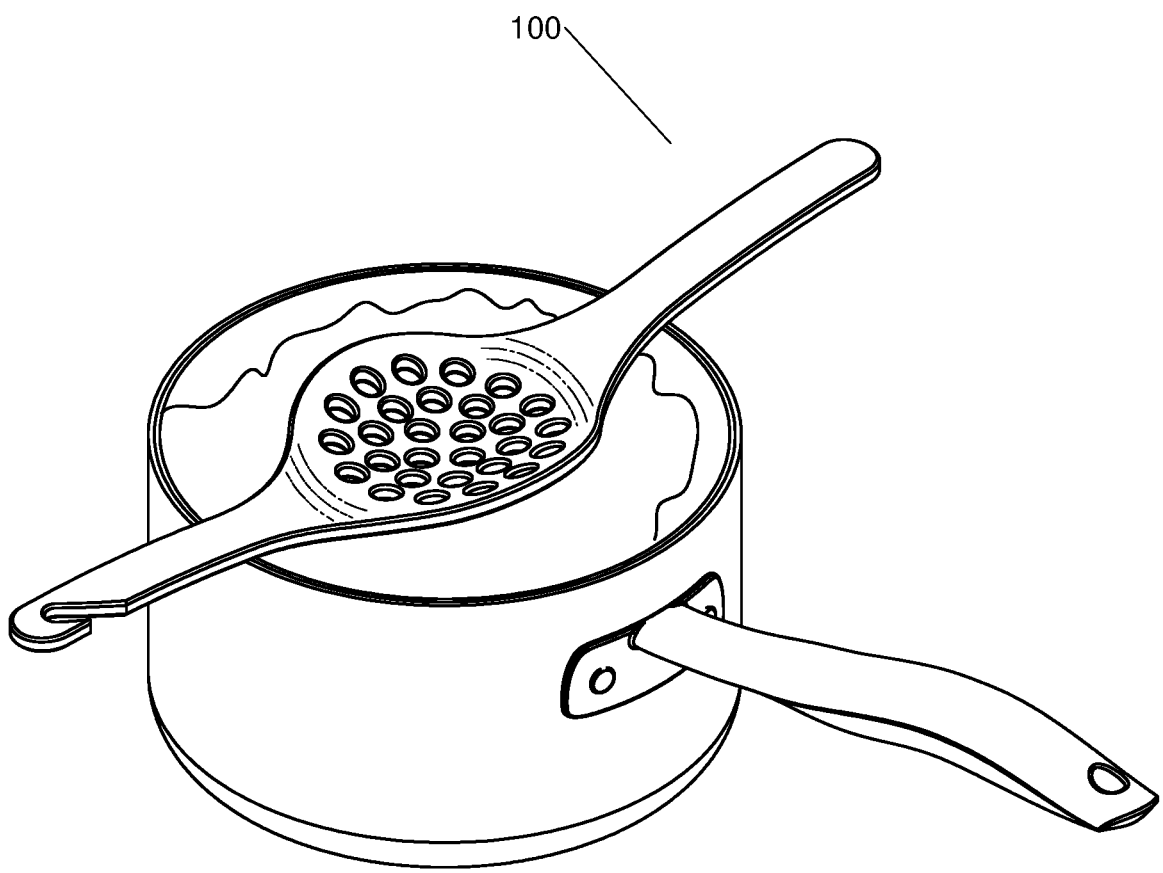
FIG. 9 depicts the Boilover Preventer of the present invention in use.

FIG. 9 depicts the Boilover Preventer of the present invention in use with a cooking vessel. The concave upper surface can be seen, and the convex lower surface of the Boilover Preventer is directed downward toward the contents of the cooking vessel. The first supporting member 101 and the second supporting member 103 can be seen straddled across the upper edge or rim of the cooking vessel, providing support for the center portion 105, allowing the center portion 105 with the plurality of holes 107 to break the surface tension of any foam or bubble containing mass that forms as a result of boiling of the contents. This disruption of surface tension causes a reduction or elimination of boilover of the contents of the cooking vessel during cooking.

To use the Device for the Prevention of Cooking Boilover, before a pot or cooking vessel reaches the point of boiling, the Device (Boilover Preventer) is placed across the cooking vessel as illustrated in FIG. 9. Should the contents begin to boil and create foam such that the level in the cooking vessel begins to rise, the rising foam ("the boilover") will contact the Boilover Preventer, cause a break in surface tension and a resulting reduction in the rising level of the cooking vessel contents.

Further, in some embodiments, the present invention includes a cooking vessel with a bottom and sides for retention of liquid and a boilover preventer.

Figure 10:
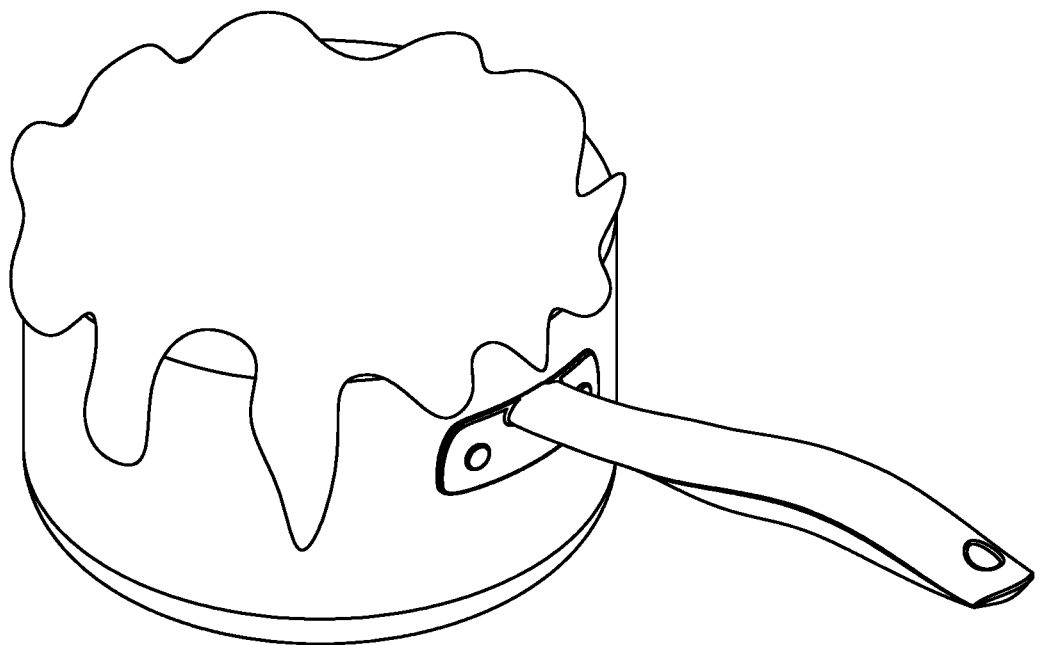
FIG. 10 depicts a boilover of a cooking pot without the Boilover Preventer of the present invention.

Without the use of the Boilover Preventer (Device for the Prevention of Cooking Boilover), a boilover is possible. FIG. 10 depicts a boilover of a cooking pot without the use of the Boilover Preventer of the present invention.

While the present invention has been described with a hanger or slot 109 in a supporting member, some embodiments may omit such a hanger or slot 109, and are depicted in FIGS. 11-18 herein.

Figure 11:
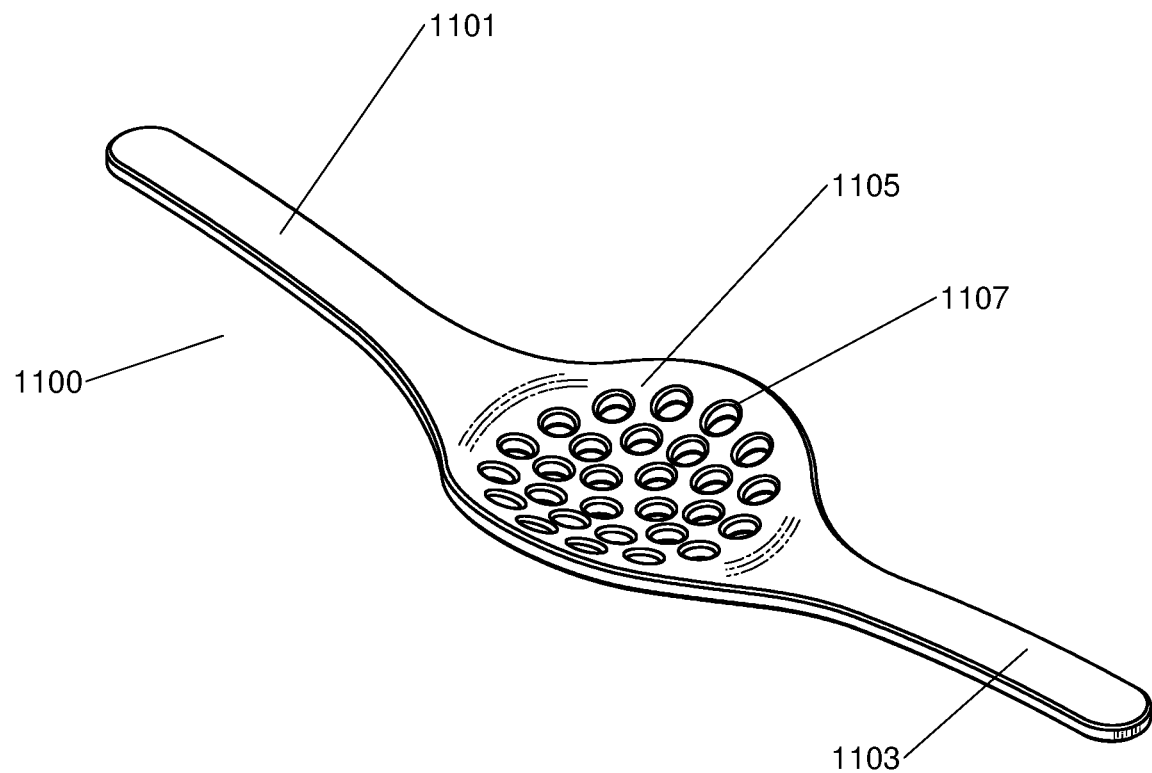
FIG. 11 is a top perspective view of an alternate embodiment of the Boilover Preventer of the present invention.

FIG. 11 is a top perspective view of an alternate embodiment of the Boilover Preventer of the present invention without the hanger or slot 109 that was previously depicted. The Boilover Preventer 1100 has a first supporting member 1101, a second supporting member 1103, and a center portion 1105. The purpose of the first supporting member and the second supporting member is to allow the device to traverse the top edges of a cooking vessel such as a pot, a saucepan, a kettle or the like, and be supported by the top of the cooking vessel and over the water or liquid composition to be protected from a boilover. The first supporting member 1101 and the second supporting member 1103 curve or are otherwise angled downward as they join the center portion 1105, thus allowing the center portion 1105 to be in close proximity or in the surface of the boiling liquid without the necessity for the liquid to be at or close to the top of the cooking vessel. The first supporting member 1101 and the second supporting member 1103 may also have an arcuate curvature. This arcuate curvature may be simple or complex, and may, in some embodiments, be downwardly concave. As used herein, the term downward refers to the direction or portion of the device that faces or is directed toward the cooking vessel that the device is being used with. Each of the supporting members has a top surface and a bottom surface and are also generally or substantially flat along their bottom surface to allow the Device for the Prevention of Cooking Boilover 1100 to sit squarely and firmly on the top edge of the cooking vessel. In some embodiments of the present invention, such a flat bottom surface may be part of a generally rectangular shape for each of the supporting members. Each of the supporting members joins the center portion 1105 in either a curvilinear or angular manner.

The supporting members may also have rounded, tapered or otherwise geometrically formed ends such as the rounded ends depicted in the figures.

The center portion 1105 has an upper surface that is generally concave (rounded inward) and a corresponding lower or downwardly directed surface that is convex (rounded outward). The lower surface extends toward the surface of boiling liquid when in use. The center portion 1105 further has a plurality of holes 1107. These holes may be arranged in a variety of patterns and geometries, and allows for increased break up of surface tension and resulting foaming bubbles, increasing the effectiveness of the device of the present invention. In one aspect of the present invention, the holes are configured as depicted in the figures, and comprise a diameter in the range of 1-15 millimeters, and in one embodiment comprise a diameter of 5-10 millimeters, with a diameter of 8 millimeters employed in one embodiment thereof. The center portion 1105 is round or oval and joins with the supporting members; presenting a downwardly sloping and generally convex lower surface to the boiling liquid.

In some embodiments of the present invention, the generally concave upper surface of the center portion 1105 has a periphery with an upwardly sloping edge that is lower where the center portion meets each supporting member than along the remainder of the periphery. Each supporting member 1101 and 1103 joins the center portion 1105 in a curvilinear manner where each supporting member gradually becomes wider, forming a curvilinear edge that becomes the rounded or oval center portion 1105. In other words, the curvilinear joining of the supporting members with the center portion 1105 creates an arc or curve where the supporting members gradually become wider as they merge with and form the center portion 1105. Such arc or curve is concave and also compound. The arc or curve that forms the center portion 1105 from each supporting member also rises upward to form the concave upper surface of the center portion 1105. In further embodiments, each supporting member joins the center portion 1105 in an angular manner where the curve or arc previously described is replaced with an angle that may be in the range of zero degrees to 180 degrees. A zero degree angle implies that the supporting members and the center portion 1105 do not vary in width, whereas a 90 degree angle implies that the center portion is of a square, rectangular or polygonal form.

The Device for the Prevention of Cooking Boilover (or Boilover Preventer) 1100 may be made from a material such as a rigid material, for example a plastic or a metal. Examples of suitable plastics include melamine, polypropylene, polyvinyl chloride, polytetrafluoroethylene, silicone, other high temperature materials, and the like. Bioplastics may also be used in some embodiments of the present invention. In addition, reinforced plastics, metals, and other materials that may be suitably formed may also be used. The Device for the Prevention of Cooking Boilover (or Boilover Preventer) may be made by injection molding, blow molding, machining, or the like.

Figure 12:
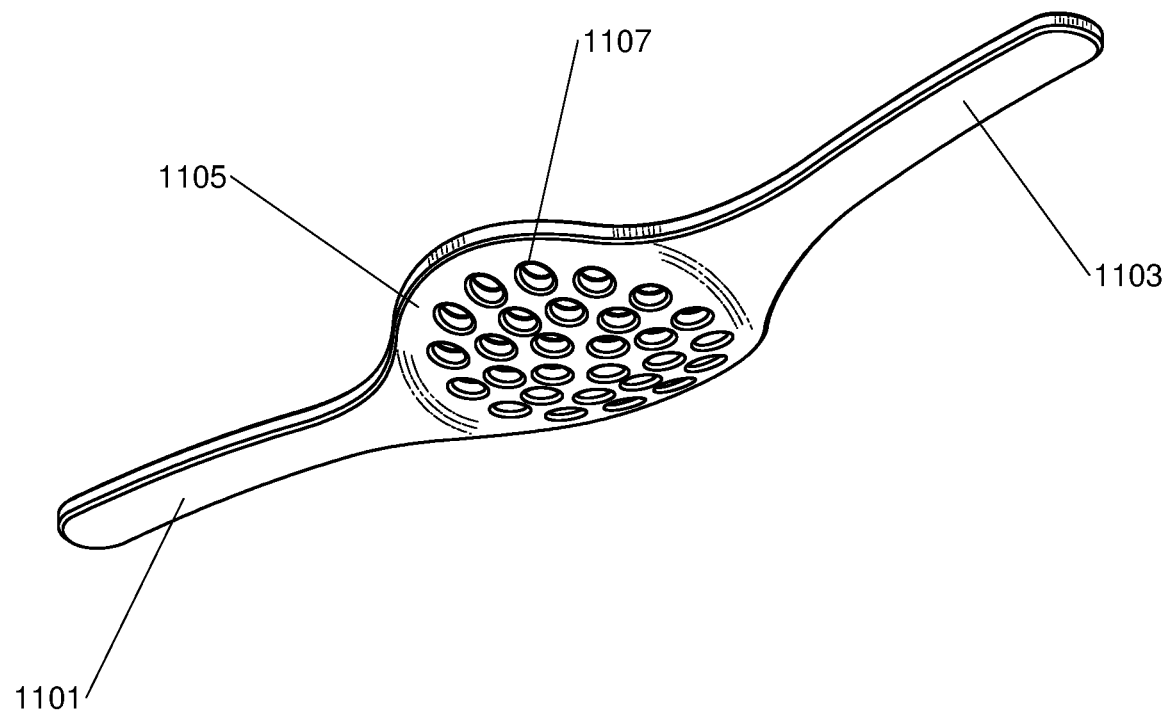
FIG. 12 is a bottom perspective view of the Boilover Preventer of FIG. 11.

FIG. 12 depicts a bottom perspective view of the Device for the Prevention of Cooking Boilover (Boilover Preventer) 1100. The geometries heretofore described can be seen. The convex lower surface of the center portion 1105 being visible along with the plurality of holes 1107. It should be noted that while the holes 1107 are depicted as circular, they may also be adapted to a variety of shapes such as various polygons, ovals, and the like.

Figure 13:
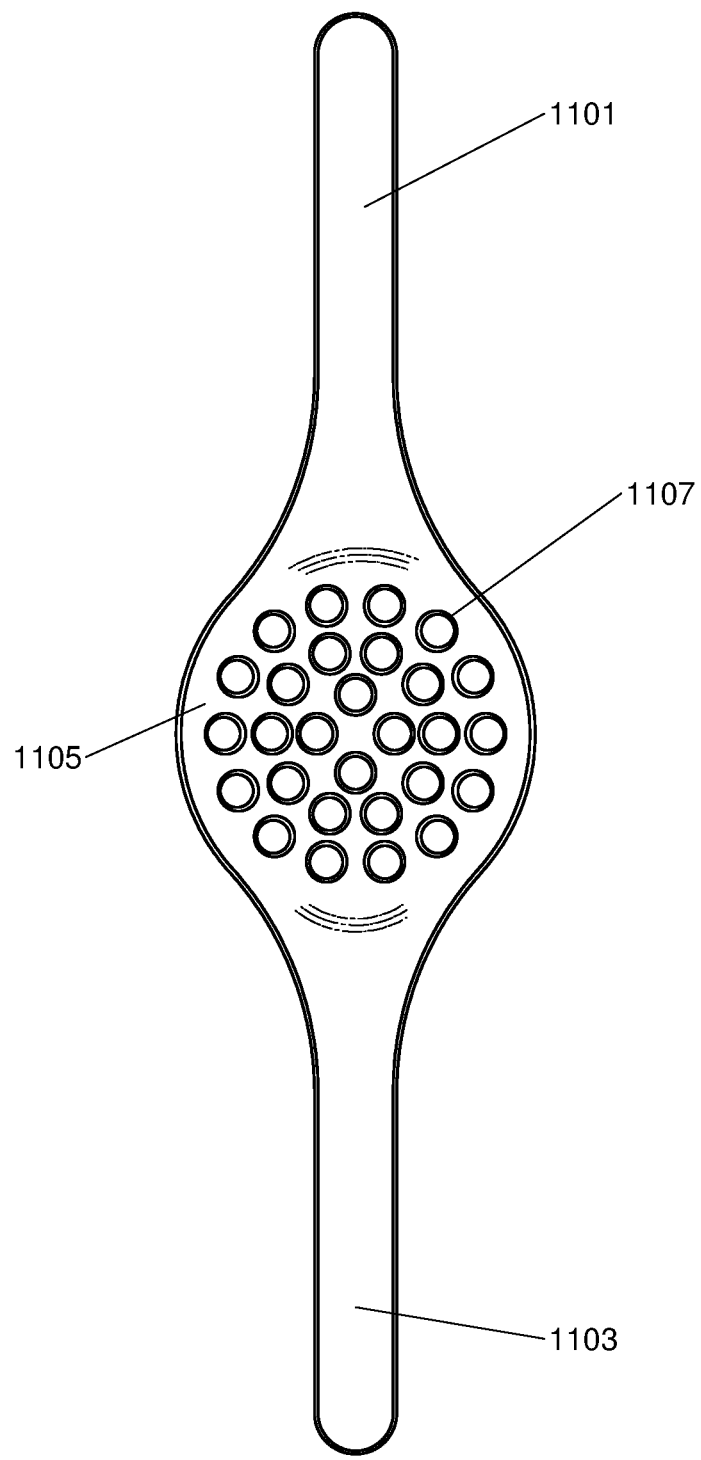
FIG. 13 is a top plan view of the Boilover Preventer of FIG. 11.

FIG. 13 is a top plan view of the Boilover Preventer showing clearly the way in which the first supporting member 1101 and the second supporting member 1103 join to the center portion 1105. In this alternate embodiment, the hanger or slot previously depicted in FIGS. 1-9 has been omitted.

Figure 14:
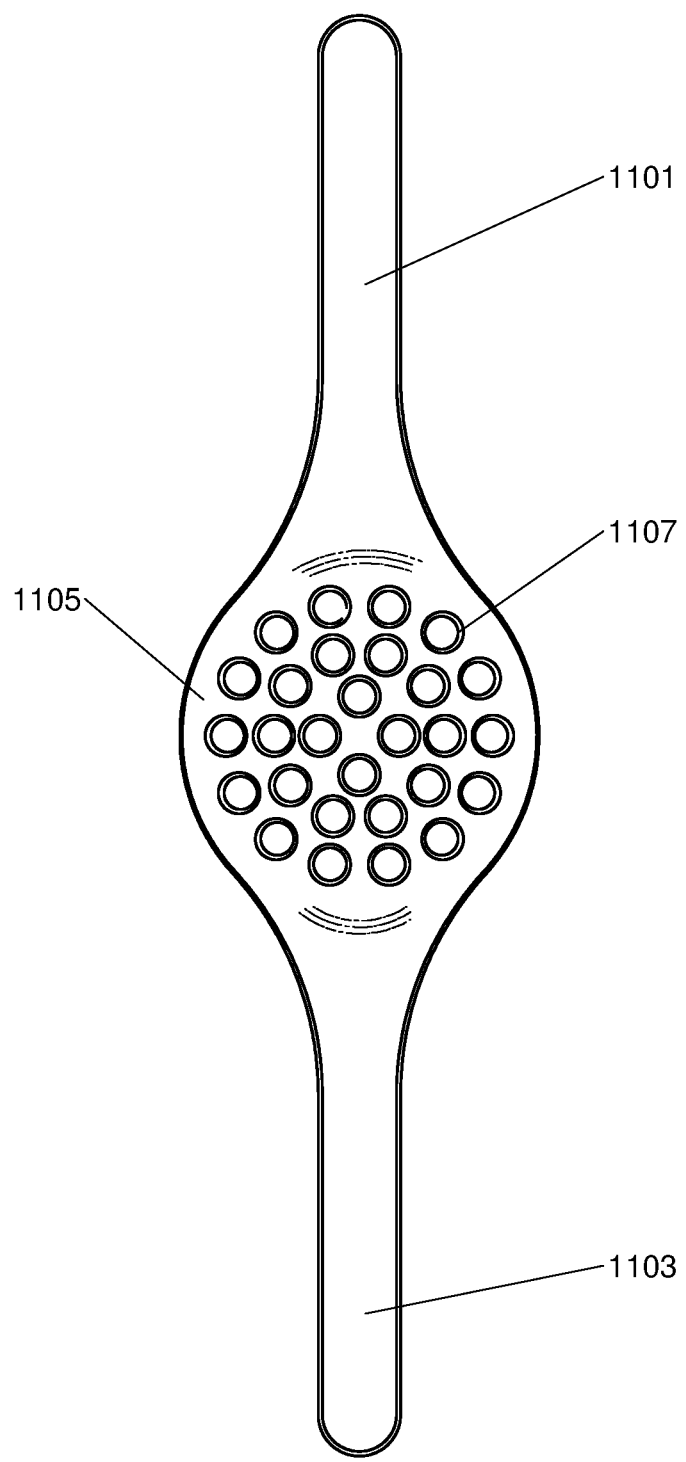
FIG. 14 is a bottom plan view of the Boilover Preventer of FIG. 11.

FIG. 14 is a bottom plan view of the Boilover Preventer 1100 where the plurality of holes 1107 through the center portion 1105 can be seen.

Figure 15:
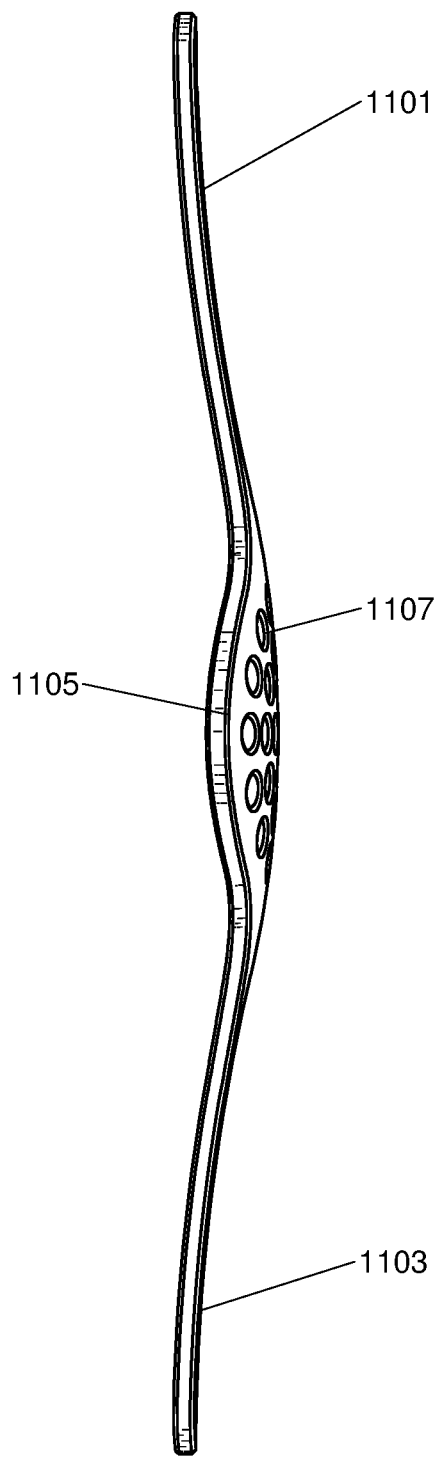
FIG. 15 is a side plan view of the Boilover Preventer of FIG. 11.
Figure 16:
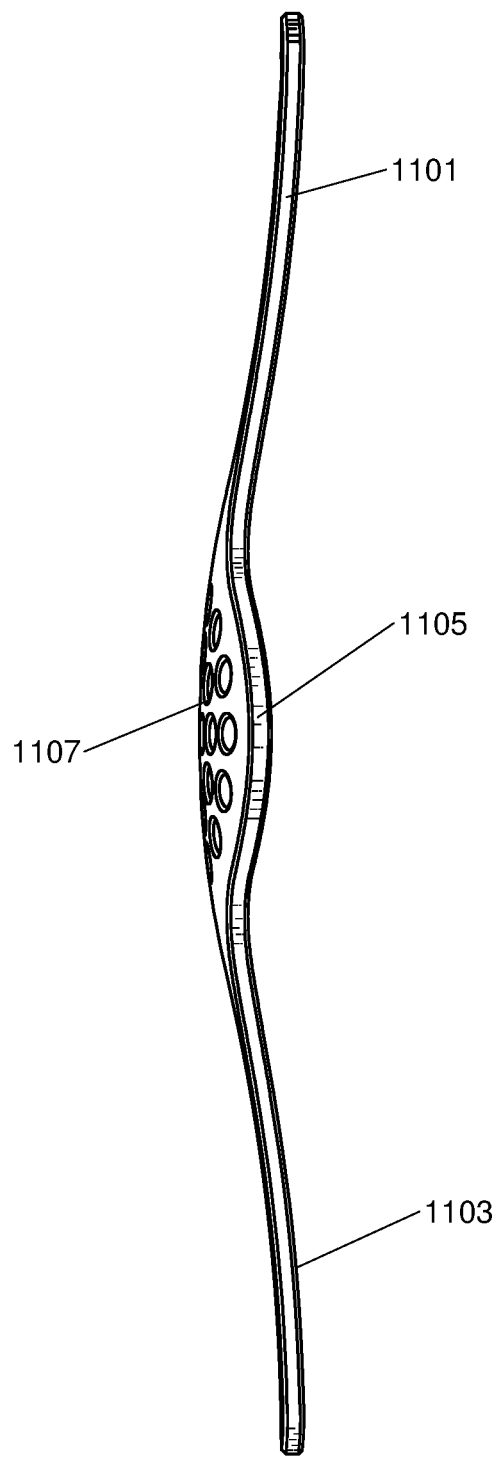
FIG. 16 is an alternate side plan view of the Boilover Preventer of FIG. 11.

FIG. 15 is a side plan view of the Boilover Preventer 1100 and FIG. 16 is an alternate side plan view of the Boilover Preventer 1100, both of which depict the curved or arcuate geometries of the device that facilitate placement on a cooking vessel and boilover reduction or elimination while the cooking vessel is in use.

Figure 17:
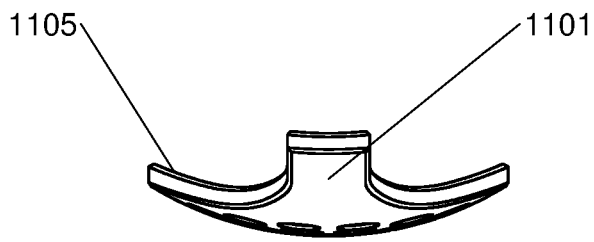
FIG. 17 is an end plan view of the Boilover Preventer of FIG. 11.
Figure 18:
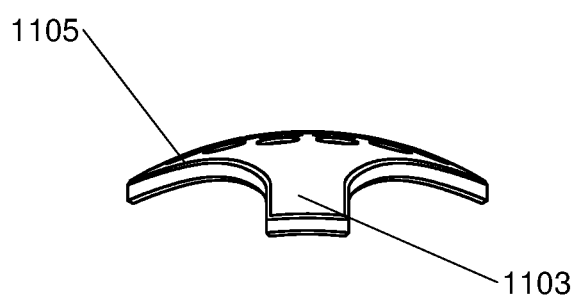
FIG. 18 is an alternate end plan view of the Boilover Preventer of FIG. 11.

FIG. 17 is an end plan view of the Boilover Preventer 1100 and FIG. 18 is an alternate end plan view of the Boilover Preventer 1100, showing clearly the concave upper surface of the center portion 1105.

To use the Device for the Prevention of Cooking Boilover 1100 (which is similar to the Device for the Prevention of Cooking Boilover 100 except that the hanger or slot 109 has been omitted), before a pot or cooking vessel reaches the point of boiling, the Device (Boilover Preventer) is placed across the cooking vessel in use. Should the contents begin to boil and create foam such that the level in the cooking vessel begins to rise, the rising foam ("the boilover") will contact the Boilover Preventer, cause a break in surface tension and a resulting reduction in the rising level of the cooking vessel contents.

Further, in some embodiments, the present invention includes a cooking vessel with a bottom and sides for retention of liquid and a boilover preventer 1100.

It is, therefore, apparent that there has been provided, in accordance with the various objects of the present invention, a Device for the Prevention of Cooking Boilover (Boilover Preventer). While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and the attached drawings.

What is claimed is:

1. A device for the prevention of cooking boilover from a cooking vessel, the device comprising:
    a first supporting member and a second supporting member;
    a center portion having a generally rounded shape and joined to the first supporting member and the second supporting member;
    the first supporting member and the second supporting member each comprising an elongate element extending outward and upward from the center portion to support the center portion on a cooking vessel;
    wherein each supporting member has a downward curvature into the center portion to cause the center portion to be at a lower elevation than each elongate element when in use;
    wherein the width of each supporting member is less than the width of the center portion such that the device does not fully cover or otherwise seal the cooking vessel;
    the center portion having a generally spherically concave upper surface and a generally spherically convex lower surface with a plurality of holes through the center portion.

2. The device for the prevention of cooking boilover of claim 1, wherein the center portion is round.

3. The device for the prevention of cooking boilover of claim 1, wherein the center portion is oval.

4. The device for the prevention of cooking boilover of claim 1, wherein each of the supporting members has a rectangular shape with a top surface and a bottom surface and is substantially flat along the bottom surface.

5. The device for the prevention of cooking boilover of claim 1, wherein the first supporting member and the second supporting member curve downward as they join the center portion.

6. The device for the prevention of cooking boilover of claim 1, wherein the first supporting member and the second supporting member have an arcuate curvature.

7. The device for the prevention of cooking boilover of claim 6, wherein the arcuate curvature of the first supporting member and the second supporting member are downwardly concave.

8. The device for the prevention of cooking boilover of claim 1, wherein the first supporting member has a slot for storage.

9. The device for the prevention of cooking boilover of claim 1, wherein the second supporting member has a slot for storage.

10. The device for the prevention of cooking boilover of claim 1, wherein the center portion has a periphery with an upwardly sloping edge that is lower where the center portion meets each supporting member than along the remainder of the periphery.

11. The device for the prevention of cooking boilover of claim 1, wherein each supporting member joins the center portion in a curvilinear manner.

12. The device for the prevention of cooking boilover of claim 1, wherein each supporting member joins the center portion in an angular manner.

13. The device for the prevention of cooking boilover of claim 1, wherein each supporting member has a rounded end.

14. The device for the prevention of cooking boilover of claim 1, wherein each supporting member has a generally concave upper surface and a generally convex lower surface.

15. A device for the prevention of cooking boilover from a cooking vessel, the device comprising:
    a first supporting member and a second supporting member;
    a center portion having a generally rounded shape and comprising an upper surface and a lower surface, wherein the center portion is joined to the first supporting member and the second supporting member;
    the first supporting member and the second supporting member each comprising an elongate element extending outward and upward from the center portion to support the center portion on a cooking vessel;
    wherein each supporting member has a downward curvature into the center portion to cause the center portion to be at a lower elevation than each elongate element when in use;
    wherein the width of each supporting member is less than the width of the center portion such that the device does not fully cover or otherwise seal the cooking vessel;
    and wherein the center portion has a generally spherical concave upper surface and a generally spherically convex lower surface with a plurality of holes through the center portion.

16. The device of claim 15, wherein the center portion is round.

17. The device for the prevention of cooking boilover of claim 15, wherein the center portion is oval.

18. The device for the prevention of boilover of claim 15, wherein the center portion has a generally concave upper surface and a generally convex lower surface.

19. The device for the prevention of boilover of claim 15, wherein the first supporting member and the second supporting member have an arcuate curvature.

20. A cooking vessel comprising:
a bottom and sides for the retention of liquid; and
a boilover preventer comprising a first supporting member and a second supporting member; a center portion having a generally rounded shape and comprising an upper surface and a lower surface, wherein the center portion is joined to the first supporting member and the second supporting member; the first supporting member and the second supporting member each comprising an elongate element extending outward and upward from the center portion to support the center portion on the cooking vessel;
wherein each supporting member has a downward curvature into the center portion to cause the center portion to be at a lower elevation than each elongate element when in use;
wherein the width of each supporting member is less than the width of the center portion such that the device does not fully cover or otherwise seal the cooking vessel; and wherein the center portion has a generally spherical concave upper surface and a generally spherically convex lower surface with a plurality of holes through the center portion.

* * * * *